April 15, 1952  F. C. WILLIAMS  2,592,777
PULSE-ECHO IDENTIFYING SYSTEM
Filed Aug. 21, 1946  3 Sheets-Sheet 1

Inventor
FREDERIC C. WILLIAMS
By
Cushman, Darby & Cushman
Attorney

April 15, 1952 F. C. WILLIAMS 2,592,777
PULSE-ECHO IDENTIFYING SYSTEM
Filed Aug. 21, 1946 3 Sheets-Sheet 3

INVENTOR
FREDERIC C. WILLIAMS
BY
Cushman, Darby & Cushman
ATTORNEYS

Patented Apr. 15, 1952

2,592,777

UNITED STATES PATENT OFFICE 2,592,777

PULSE-ECHO IDENTIFYING SYSTEM

Frederic Calland Williams, Great Malvern, England, assignor to Minister of Supply in His Majesty's Government of the United Kingdom of Great Britain and Northern Ireland, London, England Application August 21, 1946, Serial No. 692,085

Section 1, Public Law 690, August 8, 1946
Patent expires March 13, 1963

20 Claims. (Cl. 343—6)

This invention relates to wireless signalling systems for automatically establishing the identity of an object provided with a transmitter which is controlled by a receiver in communication with an interrogating transmitter and to apparatus for use in such systems. Such systems may be used, for instance, to distinguish friendly from hostile aircraft, when it is desirable to prevent any unauthorised observer from detecting the source of the reply.

The apparatus employed in these systems comprises a wireless transmitter for radiating a calling signal located at the observation post and known as the interrogator, and a combined wireless receiver and transmitter located on a mobile craft or a ground station and known as the responder which is automatically triggered by the calling or interrogating signal and thereupon radiates an identification signal in reply thereto.

One object of the present invention is to provide a system of the kind referred to and apparatus therefor in which the means of recognition is limited to one or more authorised observers provided with appropriate received signal indicating and interpreting equipment and in which a high degree of secrecy and reliability may be obtained in operation.

Another object of the invention is to provide a wireless signalling system of the kind referred to in which the interrogator is arranged to radiate a series of separated radio-frequency pulses and in which the responder is arranged to radiate separate counterpart pulses in response to each of certain individual pulses of the interrogation pulse series, selection of those interrogation pulses to which counterpart radiation takes place being controllable at the responder so as to provide a characteristic coded response.

A further object of the invention is to provide a wireless signalling system of the kind referred to wherein the interrogator is arranged to radiate a series of separated radio-frequency pulses and in which the responder is arranged to radiate separate counterpart radio-frequency pulses in response to a chosen number of said received interrogation pulses, the time duration of said counterpart pulses being variable according to a predetermined coding sequence so as to provide a characteristic identification signal.

Yet a further object of the invention is to provide a responder for use in a wireless signalling system of the kind referred to and comprising radio receiving means, radio transmitting means controlled by the signal output of said receiving means so as to effect the transmission of counterpart radio-frequency pulses in response to individual interrogating signal pulses and means for repeatedly imposing a characteristic and predetermined variation in the nature of the transmitted counterpart pulses so as to provide a characteristic coded response.

A particular form of responder embodying the invention comprises a super-regenerative receiving valve which serves to trigger a pulsed or self-blocking oscillator, the oscillator being regeneratively back-coupled through an amplifier during the period of each pulse radiated by the transmitter. The super-regenerative receiving valve and the oscillator may have a common envelope.

The receiver effecting identification is, in certain forms of apparatus embodying the invention, operated in combination with any known radio-location equipment of the type which uses a pulsed exploring wave to indicate the position of a distant body by reflection. Since the reaction of the responder to an interrogating impulse is practically instantaneous, the time-interval required for recognition at the observation post will be substantially the same as that which separates an outgoing exploring pulse from its reflected echo. If the interrogator and a signal interpreter are both linked to the time-base of the cathode ray tube indicator of the radio-location equipment, the coincidence of the two types of signal serves to identify the character as well as the position of any selected one of several bodies simultaneously within the field of exploration.

In applying the invention to the interrogation of a fixed beacon station, a voltage representing the time-interval between the outgoing call and the incoming response may be used to produce an indication in a time-base synchronized with the interrogator and thus similarly to indicate the distance, as well as the identity of the interrogated beacon.

In order that the invention may be more clearly understood and readily carried into effect, certain forms of apparatus embodying the invention will now be described in greater detail by way of example with reference to the accompanying drawings in which.

Figure 1:
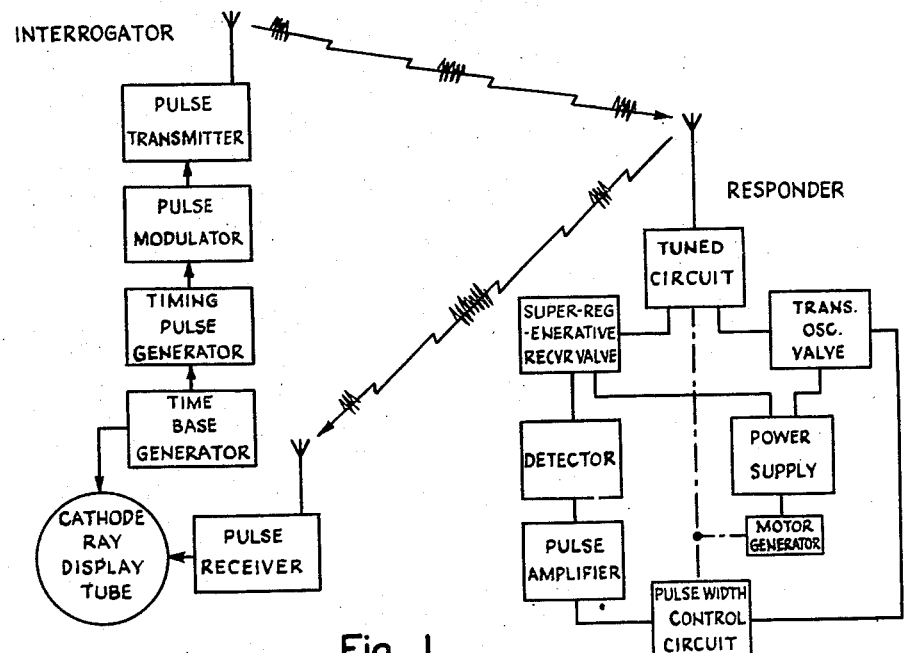
Fig. 1 is a block schematic diagram of the necessary interrogation and responder arrangements constituting one form of wireless signalling system according to the invention.

Referring first to Fig. 1, which illustrates in block schematic form, one typical signalling system according to the invention, the interrogator is constituted by a radio-location equipment comprising essentially a pulse radio transmitter feeding its output power to a suitable aerial and controlled in its pulse modulation by the output from a pulse modulator which is rigidly controlled in turn by a timing pulse generator operating at a suitable chosen frequency, i. e., that required for the pulse-recurrence rate. The timing pulse generator also controls the operation of a time-base generator which is associated with a cathode-ray display tube, the cathode beam of which is also arranged to display by its deflection at right angles to that of the time base, signals received by a pulse receiver also timed to the transmission frequency and coupled to a suitable receiving aerial. The arrangements depicted schematically are of well known form and need not be described in detail, the operation broadly being the regularly repeated transmission of powerful pulses of radio energy at a chosen radiation frequency from the transmitter accompanied by a synchronized sweeping movement of the cathode beam of the associated cathode ray tube in its time-base deflection across the tube screen. Any returned echo signal is picked up by the receiver aerial and, after suitable amplification and detection, effects deflection of the tube beam at a position displaced from the commencement of the time-base sweep by an amount which is a measure of the time-delay thereof after the outgoing pulse which caused it and which is, therefore, indicative of the range of the reflecting object.

The distant object, in the example shown, is provided with a responder according to the invention for establishing its identity. This responder comprises an aerial connected to a tuned oscillatory circuit which is common to the input of a superregenerative receiving valve and to the output of a transmitting oscillator valve which latter, however, is held in suppressed condition by the application of suitable negative grid-biasing potential. The tuned circuit is made variable in its resonance frequency and the latter is arranged to be swept repeatedly over a range of frequencies such as are utilized as the different radiation frequencies of a number of radio-location equipments. This sweeping is conveniently effected mechanically by motive power derived from the shaft of a motor generator serving to provide the requisite high-tension supply to the apparatus.

Upon resonance of the tuned circuit with the frequency of any interrogating or exploring pulses, these will be picked up and, after amplification by the super-regenerative receiving valve, demodulated in a detector and the extracted modulation envelope, in the form of a pulse, further amplified by a suitable pulse amplifier. The output of the latter is then applied by way of a pulse-width control circuit comprising a suitable resistance/capacitance network, to the transmitting oscillator valve whereby the suppression of the latter is temporarily overcome for the duration of the pulse output from the control circuit and radiation effected by a much magnified response or counterpart pulse to the interrogating pulse which initiated it. This response pulse supplants the normal and relatively weak echo pulse produced by reflection from the object in which the responder is located.

This response pulse travels back to the interrogator and is there received in similar manner to echo pulse signals, but by virtue of its greatly enhanced power, causes a recognizably amplified deflection of the display tube beam.

In order to permit identification of the particular object carrying the responder from other objects having similar responding facilities, the motor generator is also arranged to drive means which periodically, and repeatedly, effect some alteration in the character of the response signals, so as to provide a coded response instead of an indiscriminate response to any incident interrogation pulses. For example, such means may alter the characteristics of the pulse width control circuit whereby the response pulses are each made recognizably longer or shorter in their time duration and hence in the length of the time-base trace on the screen of the cathode ray tube of the interrogator receiver. Alternatively or additionally, such motor generator may control a power supply to the receiving and transmitting valves whereby the latter are periodically put out of action.

Figure 2:
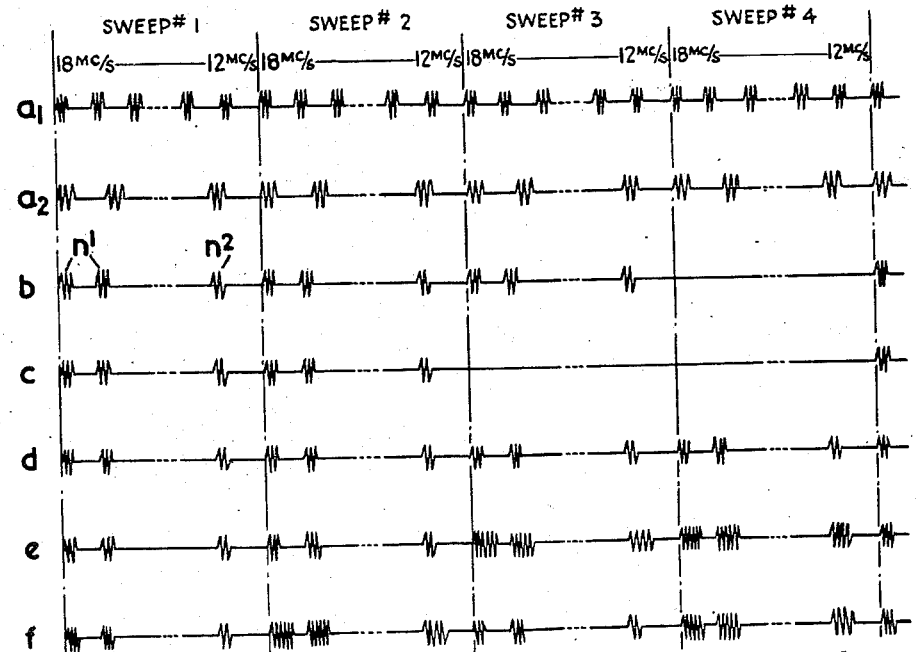
Fig. 2 is a series of graphical diagrams illustrative of the general form of interrogation signal and a number of examples of coded response signals.

Fig. 2 attempts to illustrate in diagrammatic manner a number of positive coded response signals and shows also how these are each initiated by and only occur as a result of the incidence of an interrogation signal. At $a_1$ is shown a continuous series of interrogating pulses radiated at a chosen repetition rate, say 500 per second, and at one radiation frequency, say 18 mc./s., from a first interrogator. Diagram $a_2$ illustrates a similar series at a different repetition rate, say 200 per second, and at a different radiation frequency, say 12 mc./s. It will be appreciated that no attempt has been made to depict the pulses and the intervening time intervals to a common scale as this is impracticable since the individual pulses are usually of the order of 1 to 25 microseconds duration and the intervening intervals of the order of 1 to 40 milliseconds. Similarly the total period illustrated is assumed to be of the order of, say, 12 seconds, divided into four equal periods of 3 seconds each, marked sweep 1, sweep 2, sweep 3 and sweep 4. The tuned circuit of the responder is assumed to be swept through a tuning range of 18 mc./s. to 12 mc./s. once every 3 seconds.

In diagram $b$ is shown one possible coded response, sent to each of the two interrogators. In the first 3 second sweep period response pulses $n'$ are radiated while the tuned circuit is resonant at or near the interrogation frequency of 18 mc./s., i. e., for a period of, say, one-tenth of a second, at the beginning of the sweep and further response pulses $n^2$, while the tuned circuit is resonant at the other interrogation frequency of 12 mc./s., at the end of the sweep. This state of affairs is continued during the following two sweeps but in the fourth sweep of each cycle, the power supply is arranged to be cut-off whereby there is no response action whatever. The resultant display signal at the interrogator is accordingly a much amplified deflection lasting for about one-tenth second and repeated once every 3 seconds for three periods and then followed by a blank period, after which the whole cycle is repeated again and again for so long as the responder is within operative range of the interrogator.

Diagram $c$ illustrates a different coded signal form consisting of response pulses in the first two periods and blank periods for the remaining two of every cycle.

Instead of or in addition to the periodic suppression of response pulses in certain periods, change may be made, as described, in the effective width or time duration of the response pulses. Diagrams d, e and f illustrate examples of a code built up upon this width control basis. In diagram d each response pulse in each sweep period is of the same width, e. g., 2 microseconds duration or "narrow." In diagram e the response pulses are "narrow" during the first two periods of every four-period cycle but appreciably wider, say of 8 microseconds duration, during the remaining two periods. Diagram f shows a further variation wherein alternate periods provide narrow and then "wide" pulses.

Figure 3:
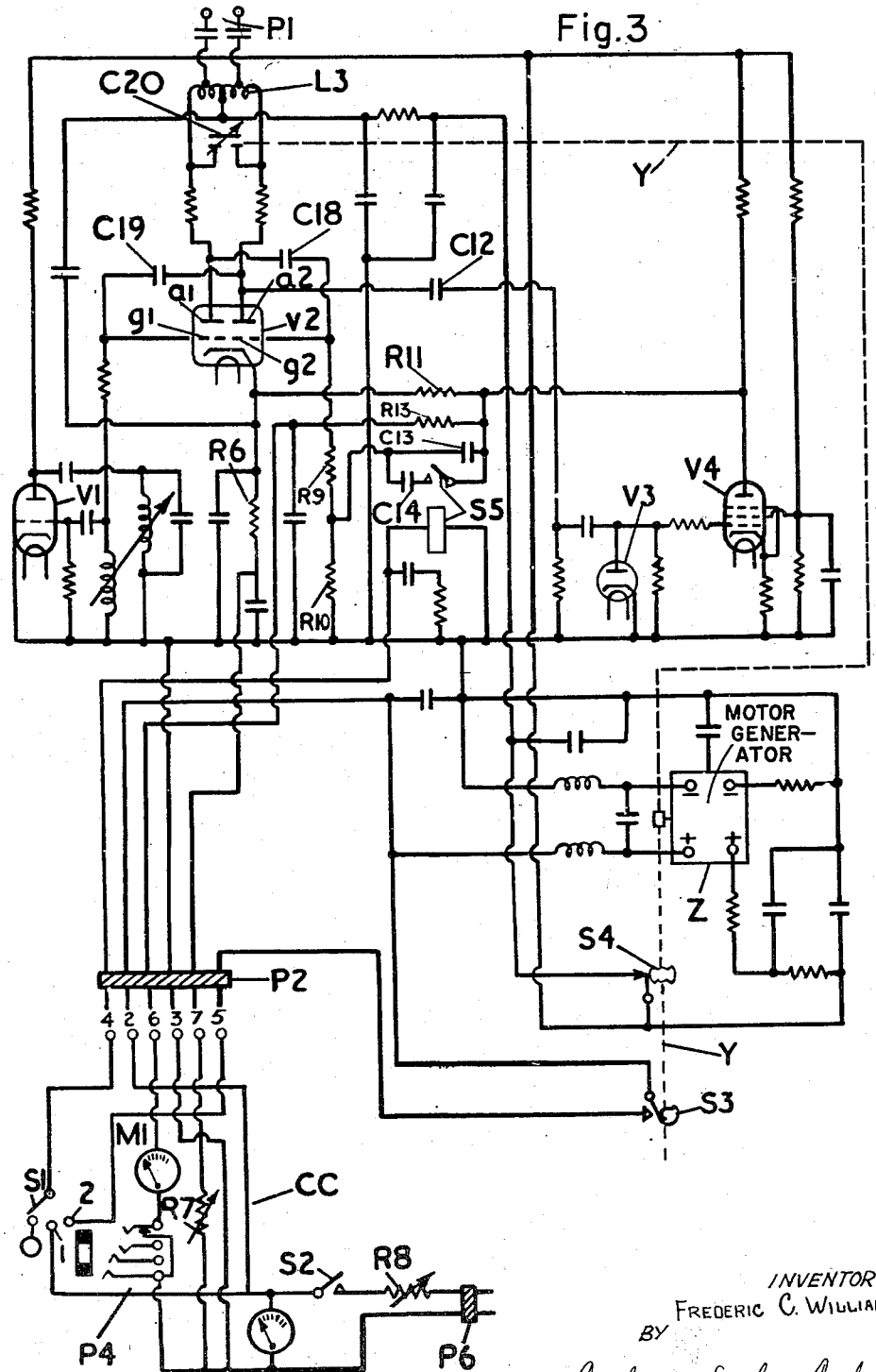
Figures 3 and 4 show alternative forms of responder circuit arrangements.

Referring now to Fig. 3 of the drawings, a simple form of responder is shown, suitable for co-operation with one or more radio-location stations each of which transmits a pulsed exploring wave on a selected carrier-frequency. A common aerial circuit L3, C20, coupled to aerial terminals P1 is connected between the two anodes $a_1$ $a_2$ of a double triode valve V2. The grid $g_1$ of this valve is regeneratively back-coupled to the circuit L3, C20 by the condenser C19 and is also subjected to quenching oscillations from a valve V1, so that the triode section of the valve controlled by the grid $g_1$ acts as a supergenerative receiver circuit. The grid $g_2$ of the other triode section is also regeneratively back-coupled to the circuit L3, C20 by the condenser C18 whereby this second triode section forms an oscillator which is, however, normally held inoperative by reason of grid $g_2$ being biased to anode current cut-off. The anode $a_2$ is also back-coupled to the grid $g_2$ through a circuit which includes a condenser C12 and a rectifier V3 which feeds the grid of an amplifier V4. The output from the anode of the latter is fed back in part through a condenser C13 and resistances R9, R10 to the grid $g_2$ of the valve V2, in part through a resistance R11 to the common cathode of the same valve and in part through a resistance R13 to a control circuit CC which is described in detail later. The valve V2 therefore operates as a sensitive relay in which the triode section comprising anode $a_1$ and grid $g_1$ amplifies a calling signal and applies it through the rectifier V3 and amplifier V4, to trigger the triode section controlled by the grid $g_2$, which thereupon rapidly builds up persistent high-frequency oscillations which are automatically squegged. These oscillations are radiated from the common aerial P1 as radio-frequency pulses of a time duration predetermined in a manner to be described.

The condenser C20 of the aerial coupling circuit is automatically and mechanically rotated to sweep the aerial tuning, say, once every three seconds, through a band-width of, say, six megacycles. Each of the radio-location stations with which the responder co-operates will transmit a pulse modulated exploring wave on one or other of the sub-bands within the sweep of the tuning condenser C20, the period during which the responder remains in tune with any given sub-band during each sweep of the condenser being of the order of one-tenth of a second.

In operation the pulse modulated exploring wave from each of the radio-location stations may serve, in its turn, as an interrogating signal, and is applied from the aerial terminals to the circuit L3, C20 and thence through condenser C19 to the grid $g_1$ of the valve V2. The amplified signal appearing across the circuit L3, C20 is applied through condenser C12 to the rectifier V3 and the resultant negative D. C. potential fed to the control grid of amplifier valve V4. The amplified positive potential appearing at the anode of valve V4 is applied through condenser C13, grid $g_2$ of valve V1 so that the suppressed triode oscillator circuit controlled by this grid is triggered and continues to oscillate for a predetermined period, thus producing a counterpart pulse of signal energy for each received interrogation pulse. The feed-back from anode $a_2$ to grid $g_2$ through the pulse amplifier V4 is maintained until the rectified voltage from the diode V3 blocks the grid of the amplifier V4.

The period of each counterpart pulse is determined by the time constants of the circuit, and more particularly by the value of the condenser C13, which after a period of say six microseconds of oscillation of the triode section $a_2$, $g_2$ of valve V2, becomes charged by grid current sufficiently to block or "squegg" the grid $g_2$ and so stop further oscillation. There follows a period of say 200 microseconds during which the charge on condenser C13 leaks away and the circuit is gradually restored to the receiving condition, this period being sufficiently long to prevent any risk of interaction or "singing" between this responder and another similar responder within comparatively close range of each other.

The response pulsed oscillations are suitably coded and constitute the identification signal. The outgoing pulses are automatically keyed either by a make-and-break method or by systematically varying the normal width of the radiated pulses so as to produce a characteristic Morse pattern on a receiver cathode ray tube. With a coding cycle of say twelve seconds, made up of four three-second tuning sweeps or periods, make-and-break keying may be used to produce say three consecutive periods of narrow pulses followed by a blank period as shown in diagram b of Fig. 2; or two consecutive periods of narrow pulses followed by two consecutive blank periods as shown in diagram c of Fig. 2; and so on. Preferably the high-tension supply to the anodes of the valve V2 is switched on and off, to give the required coding sequence by means of a relay which may be energised automatically by contacts on a rotating shaft. In the variable-width method of keying, one Morse character may consist of four consecutive periods of narrow pulses as shown in diagram d of Fig. 2; another may comprise two consecutive periods of narrow pulses followed by two consecutive periods of wider pulses as shown in diagram e of Fig. 2; a third may be formed of alternate periods of narrow and wide pulses as shown in diagram f of Fig. 2; and so on. The pulses are varied from narrow to wide by means of an electromagnetic relay or switch S5 which will be referred to as a coding switch and which inserts a condenser C14 in parallel with the condenser C13, thereby increasing the time constant of the resistance/capacity network and have the duration of each radiated pulse from, say, six to eighteen microseconds due to the longer period required to charge the parallel combination by the grid current.

As shown, the coding switch S5 is energised from the primary current supply source which feeds a motor-generator Z which in turn provides the H. T. supply voltages for the device and also controls the sweep of the tuning condenser C20. Primary current is taken from a battery through terminals P6 in the control circuit CC and is fed to the motor-generator Z through a variable resistance R8, a remote-control switch S2, and the contacts 3 and 2 of a plug P2. The motor-generator Z drives a low-speed shaft Y which is arranged constantly to rotate the tuning condenser C20 through the allotted frequency band twice during each revolution, and also to operate two cam switches S3, S4. The switch S4 periodically makes and interrupts the high-tension supply to the oscillator valve V2 so that the latter has two "live" periods in each revolution of the shaft Y coincident with the tuning condenser C20 sweeping the tuning band from one end to the other and two "dead" periods while the condenser C20 is returning to its starting point. The switch S3 which forms part of the circuit controlling the coding switch S5 closes for half the period of each revolution of the shaft Y, i. e., during one of the two "live" periods of V2. The operation of the coding switch S5 is also controlled by a selector switch S1 which has three positions. In position 0 of switch S1 the energizing circuit of coding switch S5 is permanently broken and it is therefore not operated; in position 1 the coding switch S5 is continuously energised; and in position 2 it is energised via the cam-switch S3. Accordingly when the selector switch S1 is set to position 0, the signal pulses are consecutively narrow; in position 1 they are consecutively wide; whilst in position 2 they are alternatively wide and narrow, since the transmitter is energised twice per revolution of the shaft Y by the cam S4 and the coding switch S5 is only closed once per revolution by the cam S3.

A lead from the anode of the pulse-amplifier V4 is taken through a resistance R13 and contact 6 of the plug P2 to the control circuit CC which includes a monitoring meter M1 and a headphone plug P4 to allow the operator to check the outgoing pulses. The control circuit CC also includes a variable resistance R7 which is in series with the cathode resistance R6 of the valve V2 and is used to vary the sensitivity of reception within fine limits by control of the standing bias on the grid $g_1$ to such a value that the positive peaks of the quench oscillations from valve V1 just allow oscillation in the known super-regenerative manner.

It will be seen that an arrangement as shown in Fig. 3 will respond to the interrogating or exploring pulses, in due sequence, of any radiolocation transmitter that is operating at a frequency within the tuning range of the condenser C20. The resulting identification signals are picked up by the ordinary receiver of the radiolocation station, which acts as the interpreter, and they are caused to appear on the same timebase and in close proximity to the reflected echoes from the same craft. This automatic correlation informs an observer both of the position and of the character or type of any particular craft selected for scrutiny. Owing to its relatively wide frequency band width and greater amplitude the identification signal can be more clearly distinguished from the reflected echo-signal if the receiving circuits are slightly detuned.

The responder may be modified for co-operation with different types of radio-location apparatus by arranging that all calls are made, and all responses are given, at frequencies which are well removed from those used for the pulsed exploring waves. In such a case it follows that each radio-location station must be provided with a separate pulsed interrogator and also with a separate receiver, or interpreter, both being tuned to the carrier-wave allotted to that particular station for identification signalling.

Figure 4:
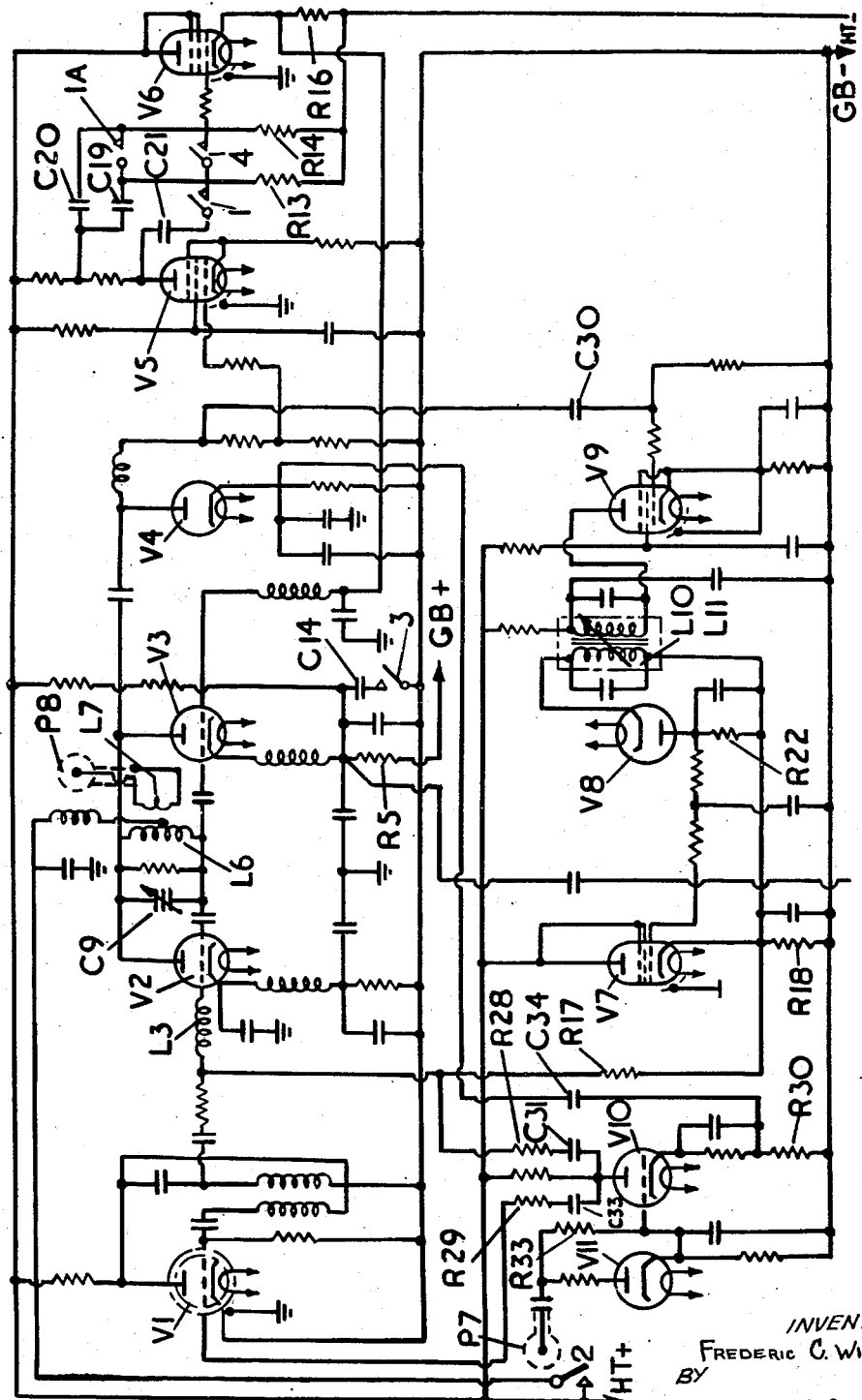

An alternative form of responder circuit is shown in Fig. 4 of the drawings in which tuning of the main oscillatory circuit comprising inductance L6 and variable condenser C9 is repeatedly swept once every three seconds through a frequency-band of 30 megacycles per second, for example, between 157 and 187 megacycles per second. Any incoming call signal is fed to that circuit from the common aerial socket P8 through a coupling coil L7. The received signal is then fed to a super-regenerative valve V2 to which quenching oscillations are fed from a quenching valve V1. The output from valve V2 serves to trigger an oscillator valve V3 which is normally biased to cut off in substantially similar manner to that previously described. In this case the resulting amplified input signal oscillations are fed to and rectified by a diode V4 and are then applied to the grid of an amplifier V5, which is coupled by way of an adjustable C, R network to a cathode follower valve V6 having a cathode load resistance R16. The resulting positive voltage from the resistance R16 is fed back to the grid of the transmitter oscillator valve V3 which is also connected to the tuned circuit L6, C9 to cause the build-up of persistent oscillations in that circuit which will still be tuned to the frequency of the initiating received signal. In this embodiment the high-frequency oscillations generated by valve V3 persist for a period of time which is determined principally by the time constants of the coupling circuits between the valves V5 and V6, and more particularly by the values of the condensers C20, C19, the latter of which is controlled by a signal coding switch 1A.

Owing to the presence of random noise and other variable factors in the super-regenerative circuit, the degree of build-up applied during each quenching cycle will, in general, be variable. In order to stabilize this effect, a part of the output from the rectifier V4 is fed through a condenser C30 to the control grid of a valve V9, which includes in its anode circuit an iron-cored transformer L10, L11 tuned to the quenching frequency. The voltage across the winding L10 is rectified by a diode V8, and is applied from the load resistance R22 to the grid of a valve V7, where it appears as a potential drop across the cathode resistance R18. From here it is fed through a resistance R17 and choke L3 to the grid of the super-regenerative amplifier V2, and so automatically checks any increase in the general level of the oscillation in the tuned circuit L6, C9. The stabilising effect described forms no part of the present invention and is the subject of co-pending U. S. Serial No. 692,084, filed August 21, 1946.

Provision is also made to inhibit the responder circuits during the operation of any other radio transmitter that may be carried by the interrogated craft. For this purpose a paralyzing voltage, synchronized with the other transmitter, is applied through a socket P7 to a diode V11, and through a resistance R33 to the grid of a valve V10. The resulting negative impulses are applied by the valve V10 through a condenser C31 and resistance R28 to the grid of the valve V2, and through a condenser C33 and resistance R29 to the grid of the quenching valve V1, and throw both these valves out of action. Simultaneously a positive voltage is fed from the cathode resistance R30 of the valve V10 through a condenser C34 to the cathode of the rectifier V4 to render that valve non-conductive. As a result the responder is temporarily rendered insensitive to all signals, including those from the local transmitter.

The aerial tuning condenser C9 is driven from a motor-generator through a cam-shaft which simultaneously controls the coding devices. One cam-contact 2 interrupts the high-tension supply to the valves V2, V3 during the return sweep of the tuning condenser C9. Another cam energises a relay not shown to close the switch 1A which brings the condenser C19 into parallel with the condenser C20 for variable-width coding. An extra wide pulse may be radiated as a distress signal and for this purpose another relay, not shown, is energized which (a) closes a switch 1 to bring a condenser C21 into parallel with the condenser C20, (b) closes a switch 4 to bring resistance R13 into parallel with a resistance R14 and (c) closes a switch 3 to connect a condenser C14 across the cathode resistance R5 of the oscillator V3 in order to condition that circuit to the wider pulse. A selector switch allows the operator to control the coding as required.

The supplementary interrogator required when identification signals removed in frequency ranges from those used by the radio-location equipment may conveniently comprise a push-pull oscillator which is grid-modulated by an impulse derived from the master-control of the radio-location circuits, so that it is locked to the time-base of the main indicator. The outgoing call is tuned to a selected "spot" frequency within the allotted wave-band of 157–197 megacycles.

The resulting identification signal from the responder is rendered visible for interpretation on the screen of the cathode ray tube indicator of the radio-location receiver. The incoming signal is first passed through a receiver which may include provision for protection against a strong signal from a local transmitter. After being amplified the identification signal is applied to the Y-plates of the cathode-ray indicator of the radio-location receiver. Since the interrogator is locked to the main time-base, the identification signal will appear as a characteristic trace superposed on the reflected echo-trace from the particular craft under observation. If desired the identification signal-trace may be related to locally generated signals to facilitate separate indication on a second cathode ray tube.

When the responder is installed in a fixed beacon, it may be desirable to send out the identification signal on a different carrier-frequency from that used for the interrogating signal, so as to enable a pilot when taking observations from the air to overcome the limitations imposed by ground-reflections, and to recognise a given beacon station at longer range than would otherwise be possible. For this purpose, the responder may be coupled to two differently-tuned aerials, one serving for reception and the other for transmission.

In cases in which a beacon is used to give an approach or blind-landing path, as well as for identification purposes, the incoming call may first be applied to a responder including a superheterodyne receiver which serves to control the response of a more powerful transmitter.

The sensitivity of the responder may be controlled in such a manner that it will reject distant signals and discriminate in favour of nearer signals by the action of appropriate delayed automatic gain control.

In order to allow the pilot to take directional observations, and, if necessary, to assist him to home or to make a blind-landing, the response signal may consist of a prolonged succession of narrow or wide pulses, followed by a coded sequence for identification purposes.

Another form of beacon responder for providing navigational aid to the pilot of an interrogating craft is arranged to transmit signals on two frequencies, one of which is identical with the call, whilst the other is slightly different. The "on frequency" response serves to give the pilot of a machine fitted with a suitable radio-location set an indication of the position and range of the interrogated beacon; whilst the "off frequency" response can be used, in combination with a switched aerial system, to provide an approach path of the overlapping-beam type, or to assist blind-landing. The "off-frequency" signals will also assist the pilot to distinguish the beacon response from other signal traces due to reflection.

I claim:

1. A wireless signalling system for establishing the identity of a responder in communication with an interrogator wherein said interrogator comprises a pulse-modulated radio transmitter for radiating a series of separated radio-frequency pulses and wherein said responder comprises a radio receiver, a second pulse-modulated radio transmitter, said transmitter being normally held in quiescent condition, circuit means interconnecting said receiver with said second transmitter for triggering the latter into operation to transmit separate counterpart pulse signals upon reception of pulse signals by said receiver, means for altering the individual time-duration of the counterpart signal pulses transmitted by said second pulse-modulated radio transmitter from one to another of at least two different and predetermined values and cyclically operated coding means controlling said time-duration altering means for causing a characteristic and repeated series of changes of time-duration of the response pulses to provide an identifying response signal from the responder.

2. A wireless signalling system according to claim 1 which includes discriminatory selecting means controlled by said cyclically operated coding means for periodically and repeatedly inhibiting the effectiveness of the pulse signals from said first transmitter upon said receiver to cause triggering of said second transmitter.

3. A wireless signalling system according to claim 2 wherein said means for effecting a discriminating selection of the interrogating pulses comprises variable and cyclically operated tuning means for said receiver.

4. A wireless signalling system according to claim 3 wherein said second transmitter includes variable and cyclically operated tuning means, the resonance frequency of said second transmitter tuning being held in step with that of said receiver tuning whereby the counterpart pulse signals are radiated at substantially the same frequency as that of the interrogating pulse signals which caused operation of the triggering means.

5. A pulse echo system comprising in combination a pulse-modulated radio transmitter, a radio receiver, cathode ray tube display means associated with said receiver for displaying pulse signals received by the latter in response to the pulses of said transmitter and a pulse signal responder which comprises a second radio receiver, a second pulse-modulated radio transmitter normally held in quiescent condition, triggering means interconnected with said second receiver and said second transmitter for releasing said second transmitter to transmit a pulse signal in response to the reception of a pulse signal by said second receiver, means associated with said second transmitter for altering the individual form of the response pulse signals generated by said second transmitter from one to another of at least two different and predetermined forms and cyclically operated coding means controlling said pulse form altering means for causing a characteristic and repeated series of changes of the form of the response pulse signals whereby the display of such response pulse signals on said display means of said first receiver provides identification of said responder.

6. A pulse echo comprising in combination a pulse-modulated radio transmitter, a radio receiver, cathode ray tube display means associated with said receiver for displaying the individual form of pulse signals received by the latter in response to the pulses of said transmitter and a pulse signal responder which comprises a second radio receiver, a second pulse-modulated radio transmitter normally held in quiescent condition, triggering means interconnected with said second receiver and said second transmitter for releasing said second transmitter to transmit a pulse signal in response to the reception of a pulse signal by said second receiver, means associated with said second transmitter for altering the individual form of the pulse signals generated by said second transmitter upon release by said triggering means from one to another of at least two different and predetermined forms and switching means controlling said pulse-form altering means for determining the displayed form of response pulses visible upon the cathode-ray tube display means of said first radio receiver.

7. A pulse echo system comprising in combination a pulse-modulated radio transmitter, an associated radio receiver, cathode ray tube display means for displaying pulse signals received by said receiver in response to the pulses of said transmitter and a pulse signal responder which comprises a second radio receiver, a second pulse-modulated radio transmitter normally held in quiescent condition, triggering means interconnected with said second receiver and said second transmitter for releasing said second transmitter to transmit a pulse signal in response to the reception of a pulse signal by said second receiver, means associated with the pulse modulating circuits of said second transmitter for altering the time duration of the pulse signals generated by said second transmitter upon release by said triggering means from one to another of at least two different and predetermined values and coding means controlling said means for altering the response pulse time duration, said coding means operating in cyclic manner to cause periodic changes in the form of the displayed response pulses identifying said responder on said display means.

8. A wireless recognition signalling system comprising an interrogating station having a pulse-modulated radio transmitter, an associated pulse signal receiver and apparatus for displaying the form of pulse signals received by said receiver in response to the pulse signals radiated from said transmitter and a responder station comprising a second radio receiver, a second radio transmitter, having a pulse-modulating circuit, said second transmitter being normally held in quiescent condition, circuit means interconnecting said second radio receiver with said second transmitter for triggering the latter into operation to transmit a response pulse signal upon reception of a pulse signal by said second receiver, means associated with the pulse-modulating circuit of said second transmitter for providing at least two different characteristic individual forms of the signal pulse provided by said second transmitter upon each triggering thereof and cyclically operating coding means controlling said pulse form altering means to cause repeated changes in a characteristic cyclic manner of the individual form of the displayed response pulses on said apparatus of said first receiver.

9. A wireless recognition signalling system comprising an interrogating station having a pulse-modulated radio transmitter operating at a fixed chosen frequency, an associated pulse signal receiver and apparatus for displaying the form of pulse signals received by said receiver in response to the pulse signals radiated from said transmitter and a responder station comprising a second radio receiver, a second pulse-modulated radio transmitter, said transmitter being normally held in quiescent condition, cyclically operated means for varying the tuning of said second receiver and said second transmitter over a range of frequencies which includes that of said first transmitter, circuit means interconnecting said second radio receiver with said second transmitter for triggering the latter into operation to transmit a response pulse signal upon reception of a pulse signal by said receiver and at substantially the same frequency as such received pulse signal and means for altering the individual form of the response pulse signal generated by said second transmitter upon each triggering thereof from one to another of at least two different and predetermined forms, said pulse form altering means being controlled by said cyclically operated tuning variation means for providing at said interrogating station a response signal display from said responder station which is an intermittent presentation of response pulse signals whose individually displayed form varies periodically.

10. A responder for use in a pulse-modulated wireless interrogation system comprising a radio receiver, a pulse-modulated radio transmitter, said transmitter being normally held in quiescent condition, circuit means interconnecting said receiver with said transmitter for causing operation of the latter to transmit a counterpart pulse signal in response to reception of a pulse signal by said receiver means for varying the individual time duration of each counterpart signal pulse from one to another of at least two different and predetermined values and switching means for controlling said means for altering the pulse time duration to provide at least two characteristically different forms of identifying response signal pulses from said responder.

11. A responder according to claim 10 which includes cyclically operated means for periodically and repeatedly inhibiting the effectiveness of pulse signals available at said receiver to cause triggering of said transmitter.

12. A responder according to claim 11 wherein said discriminating means comprises cyclically varying tuning means for said receiver.

13. A responder according to claim 12 in which said transmitter also includes cyclically varying tuning means, the resonance frequency of such transmitter tuning being held in step with that of the receiver tuning whereby the counterpart pulse signals are radiated at substantially the same frequency as that of the received pulse signals which caused them.

14. A responder for use in a pulse-modulated wireless interrogation system comprising a pulse signal receiver, a pulse-modulated radio transmitter, said transmitter being normally held in quiescent condition, circuit means interconnecting said radio receiver with said transmitter to cause operation of the latter to generate a counterpart pulse signal in response to the reception of a pulse signal by said receiver, means for altering the individual form of the counterpart signal pulses generated by said transmitter from one to another of at least two different and predetermined forms, and cyclically operated coding means controlling said pulse form altering means for causing a characteristic and repeated series of changes of the form of the response pulses identifying the responder.

15. A responder according to claim 14 wherein said means for altering the individual form of said counterpart signal pulses includes means for providing the counterpart pulses with a time duration of a number of different values and switching means for selecting any one of said time duration values.

16. A responder according to claim 14 wherein said radio transmitter includes an oscillatory thermionic valve circuit which is normally suppressed by means of a blocking bias voltage and wherein said radio receiver is arranged to provide an output signal voltage suitable for reducing said blocking bias voltage to a value permitting operation of said normally suppressed oscillatory valve circuit.

17. A responder according to claim 14 wherein said radio receiver includes a super-regeneratively operated valve.

18. A responder according to claim 14 wherein said circuit means interconnecting said receiver with said radio transmitter includes a resistance capacity network the time constant of which serves to exert a control on the time duration of the radiated counterpart signal pulse.

19. A responder according to claim 14 wherein said radio receiver includes adjustable tuning means which are mechanically operated so as to be continuously varied in a cyclic manner over a predetermined tuning range.

20. A responder according to claim 14 wherein said radio receiver includes adjustable tuning means which are mechanically operated so as to be continuously varied in a cyclic manner over a predetermined tuning range and wherein said radio transmitter is also provided with adjustable tuning mechanism which is operated in step with that of the receiver tuning means whereby each transmitted counterpart signal is effected at a frequency substantially identical with that of the received signal pulse which initiated it.

FREDERIC CALLAND WILLIAMS.

REFERENCES CITED

The following references are of record in the file of this patent:

UNITED STATES PATENTS

| Number | Name | Date |
| --- | --- | --- |
| 2,134,716 | Gunn | Nov. 1, 1938 |
| 2,159,937 | Zworykin | May 23, 1939 |
| 2,252,083 | Luck | Aug. 12, 1941 |
| 2,333,688 | Shepard | Nov. 9, 1943 |
| 2,415,667 | Wheeler | Feb. 11, 1947 |
| 2,416,346 | Potter | Feb. 25, 1947 |
| 2,418,139 | Preisman | Apr. 1, 1947 |
| 2,419,571 | Labin et al. | Apr. 29, 1947 |
| 2,421,016 | Deloraine et al. | May 27, 1947 |
| 2,453,970 | Charrier | Nov. 16, 1948 |
| 2,471,373 | Joyner | May 24, 1949 |

FOREIGN PATENTS

| Number | Country | Date |
| --- | --- | --- |
| 116,666 | Australia | Oct. 10, 1941 |
| 116,667 | Australia | Oct. 10, 1941 |